United States Patent Office 3,335,080
Patented Aug. 8, 1967

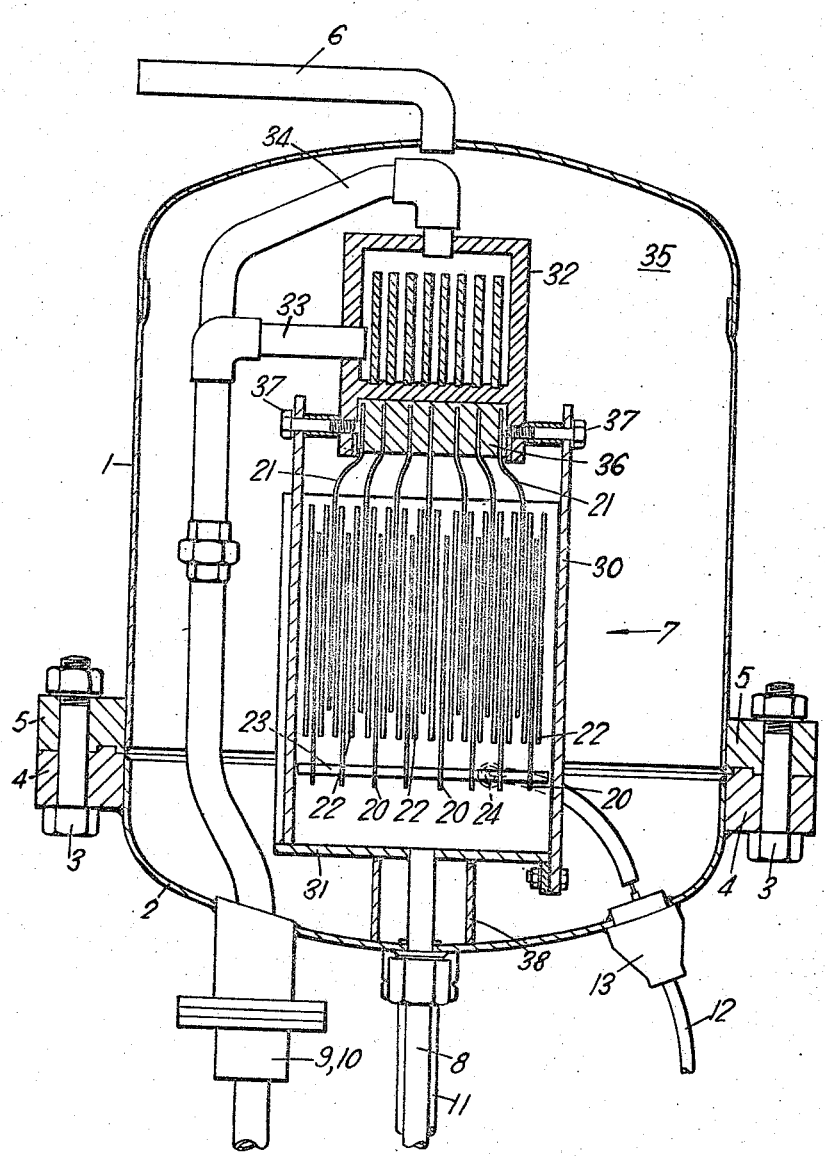

3,335,080
APPARATUS FOR CONVERTING OXYGEN TO OZONE
John George Waller and Adam Gregory Monroe, London, England, assignors to The British Oxygen Company Limited, London, England, a British company
Filed Feb. 10, 1964, Ser. No. 343,876
Claims priority, application Great Britain, Feb. 12, 1963, 5,703/63
2 Claims. (Cl. 204—322)

ABSTRACT OF THE DISCLOSURE

An ozoniser having an electrode system comprising high tension electrodes and earthed electrodes, the ends of the latter being embedded in a body of fusible alloy which provides a thermally conductive path to a source of cooling external to the electrode system and enables the earthed electrodes to be removed as a unit when required.

In an ozoniser, oxygen is converted to ozone by means of a silent discharge. During this process, considerable amounts of heat are evolved, and in order that the ozoniser may operate efficiently it is necessary for this heat to be carried away. This is particularly necessary in an ozoniser which is operated so as to produce a comparatively high proportion of ozone in the outgoing gas.

A commonly used method of dissipating the heat evolved is by water cooling, in which cooling water is circulated within the electrode system. However, this is troublesome, as the design of an assembly which is efficient and safe is not easy, particularly in view of the high electrical potentials involved, and in any case the necessity for water connections to the electrode assembly is a serious complication, as also is the bulk of an electrode assembly which includes water passages.

According to the present invention the electrode system of an ozoniser comprises high tension electrodes and earthed electrodes and the latter are connected by a direct metallic path to a source of cooling external to the electrode system. Since the source of cooling is divorced from the electrode system proper it is possible to use a coolant considerably below ambient temperature which enables the ozoniser to operate at higher efficiency than with normal water cooling. This is particularly advantageous when relatively high concentrations of ozone are being produced. Moreover the absence of water cooling passages in the electrode themselves enables them to be constructed of thin metal leading to a very compact electrode assembly.

Preferably the ends of the earthed electrodes are embedded in a body of fusible metal in direct contact with the source of cooling. This body of fusible metal, that is to say, a metal or alloy which melts at a relatively low temperature such as Wood's metal, low melting-point solder and so forth, thus constitutes the direct metallic path for cooling the electrodes. Typical of these fusible metals are the well known class of low melting alloys called the "fusible alloys." For this purpose the earthed electrodes need to be formed with extensions leading into the fusible metal and the thermal connection thus made results in a high rate of heat extraction.

The source of cooling may be constituted by a heat exchanger which is connected directly in a refrigeration circuit. In this way it is possible for the refrigerating medium to be evaporated in the heat exchanger itself thus leading to highly efficient cooling. Refrigerating mediums such as low boiling halogenated hydrocarbons may be used and Freon (Registered Trade Mark) 12 and 22 are particularly suitable.

A construction in accordance with the invention will now be described in more detail with reference to the accompanying drawing which is a cross-sectional elevation.

The ozoniser shown in the drawing comprising a pressure resistant casing in two sections, 1 and 2 held together by bolts 3 passing through flanges 4 and 5. Oxygen enters by way of an inlet connection 6 and passes downwardly through an electrode system indicated generally as 7 where part of the oxygen is converted to ozone, the mixed gases passing downwardly and out through an outlet pipe 8. This is the only outlet from the casing so that all the oxygen admitted at 6 must pass through the electrode system 7 and leave as ozonised oxygen.

Other external connections passing through the casing 2 are inlet and outlet pipes respectively for refrigerant and which lie behind one another being shown as 9 and 10. A safety valve is fitted at 11 and a bursting disc is also fitted which lies behind the connections 9 and 10 and is not seen in the drawing. Finally a high tension lead 12 passes through an insulator 13 to the high tension electrodes of the electrode system 7.

The construction of the electrode system and the cooling arrangement which form the main feature of the present invention will now be described in more detail. The electrode assembly is of the parallel plate type comprising high tension electrodes 20 made of aluminum gauze and alternating with earthed electrodes 21 made of copper sheet, adjacent electrodes being separated by sheets of mica dielectric 22. The electrodes are arranged so that the high tension electrodes project below the remainder of the assembly, having a common connection 23 to which the high tension lead 12 is connected at 24. Clearances between the electrodes are adjusted to ensure that the current does not flash over from the high tension electrodes to the earthed part of the system and for the same reason the mica projects below the earthed electrodes at the bottom of the assembly and above the high tension electrodes at the top of the assembly. In addition, the electrodes are maintained at the correct spacing by insulating strips along the vertical edges of the electrodes. For sake of simplicity these strips are not shown in the drawing but are formed of polyethylene or polytetrafluoroethylene and also serve to confine the gas flowing through the ozoniser so that it passes through the region of the discharge. The electrode system of each is enclosed within a box 30 formed of aluminum sheet and having a detachable front for assembly and inspection. The box is closed at the bottom at 31 and rests on a support ring 38, welded to the casing 2. The box is open at the top where it supports a heat exchanger 32. This is in the form of a labyrinth constructed from high conductivity copper sheet and has inlet and outlet connections 33 and 34 respectively for the refrigerating medium. In this way the heat exchanger 32 is connected directly in the refrigeration circuit so that it is possible for the refrigerating medium to be evaporated within the heat exchanger itself. The outer walls of the heat exchanger 32 are constituted by thick sections of high conductivity copper and the bottom of the heat exchanger constitutes a tray 35 filled with fusible metal 36 in which the ends of the earthed electrodes 21 are embedded. The tray 35 and hence the heat exchanger 32 as a whole is located on the upper parts of the walls of the box 30 by bolts 37. The presence of the fusible metal thus forms a continuous metallic path between the earthed electrodes 21 and the lower wall of the heat exchanger 32 thus providing highly efficient cooling of the electrode system as already described.

In a specific example of the construction shown in the drawing the high tension electrodes were of 20 gauge aluminium gauze and the earthed electrodes of copper sheet 0.010 in. thick. The mica dielectric was also 0.010 in. thick. The gap between two adjacent layers of mica was 0.040 in. when the layers enclosed a high-tension electrode and 0.030 in. in the case of an earthed electrode. There were sixty-nine high-tension electrodes and seventy earthed electrodes, the active part of each electrode being a rectangle 8¼ ins. by 4 ins. The heat-exchanger was supplied with Freon 12 at a temperature of −50° C. and the ozoniser was connected to a high-tension supply providing a current of 0.5 ampere at 5,000 volts. When oxygen was passed into this apparatus at the rate of 10 litres per minute the emerging ozonised oxygen was found to contain 8% of ozone.

The design of the ozoniser enables it to be operated at any pressure up to the limit of the casing, 1 and 2; this is convenient if it is necessary to supply the ozonised air or oxygen under pressure. Operating under pressure can, in some circumstances, favour ozone formation. The oxygen will normally be supplied in the form of commercially pure oxygen, but impure oxygen, enriched air, or even atmospheric air may be used, although the efficiency would then be reduced. If atmospheric air or other moist gas is used, it is necessary to remove the moisture, which would otherwise form a coating of ice on the cold surface of the heat-exchanger.

We claim:

1. In an ozoniser having an electrode system comprising a plurality of high tension electrodes and a plurality of earthed electrodes alternating with and having portions projecting beyond said high tension electrodes and external means for cooling said earthed electrodes, the improvement which comprises means surrounding and supporting said projecting portions of said earthed electrodes, said supporting means defining a thermally conductive path and being removably secured to said cooling means.

2. An ozoniser according to claim 1 in which said supporting means is a body of fusible alloy in which said projecting portions of said earthed electrodes are embedded.

References Cited

UNITED STATES PATENTS

| | | | |
|---|---|---|---|
| 2,309,616 | 1/1943 | Bagby et al. | 204—317 |
| 3,024,185 | 3/1962 | Fleck | 204—318 |
| 3,179,538 | 4/1965 | Dalin | 136—161 |

FOREIGN PATENTS 854,616 11/1960 Great Britain.

JOHN H. MACK, *Primary Examiner.*

R. K. MIHALEK, *Examiner.*